Nov. 27, 1962    D. W. R. McKINLEY ETAL    3,066,284
DYNAMIC GROUND DETECTORS
Filed Oct. 14, 1957    4 Sheets-Sheet 1

INVENTORS:
DONALD WILLIAM ROBERT McKINLEY
NORBERT LEO KUSTERS
ALLAN ROSS MORSE
by Roman J. Filipkowski
THEIR AGENT Nov. 27, 1962 D. W. R. McKINLEY ETAL 3,066,284
DYNAMIC GROUND DETECTORS
Filed Oct. 14, 1957 4 Sheets-Sheet 2

INVENTORS:
DONALD WILLIAM ROBERT McKINLEY
NORBERT LEO KUSTERS
ALLAN ROSS MORSE
by Roman J. Filipkowski
THEIR AGENT Nov. 27, 1962  D. W. R. McKINLEY ETAL  3,066,284
DYNAMIC GROUND DETECTORS
Filed Oct. 14, 1957  4 Sheets-Sheet 3

INVENTORS:
DONALD WILLIAM ROBERT McKINLEY
NORBERT LEO KUSTERS
ALLAN ROSS MORSE
by Roman J. Filipkowski
THEIR AGENT Nov. 27, 1962   D. W. R. McKINLEY ETAL   3,066,284
DYNAMIC GROUND DETECTORS
Filed Oct. 14, 1957                        4 Sheets-Sheet 4
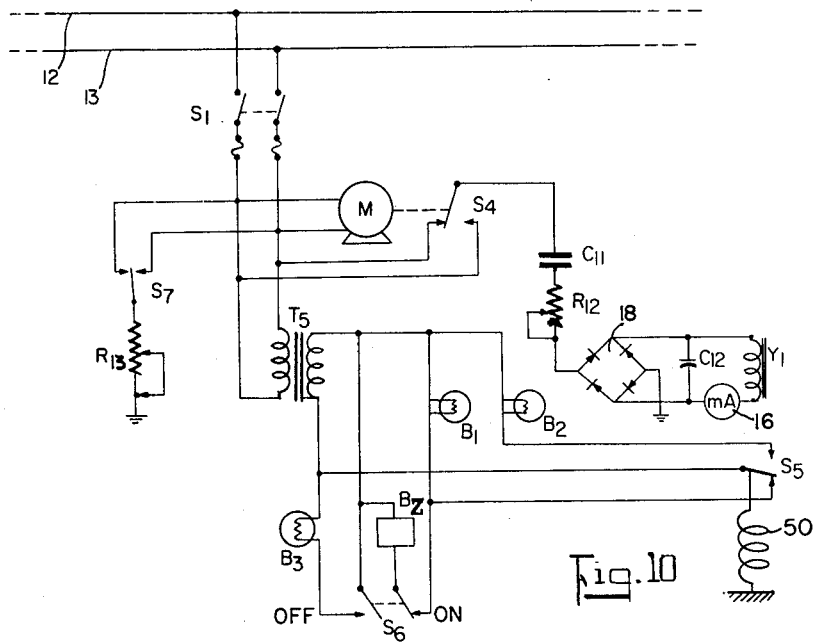
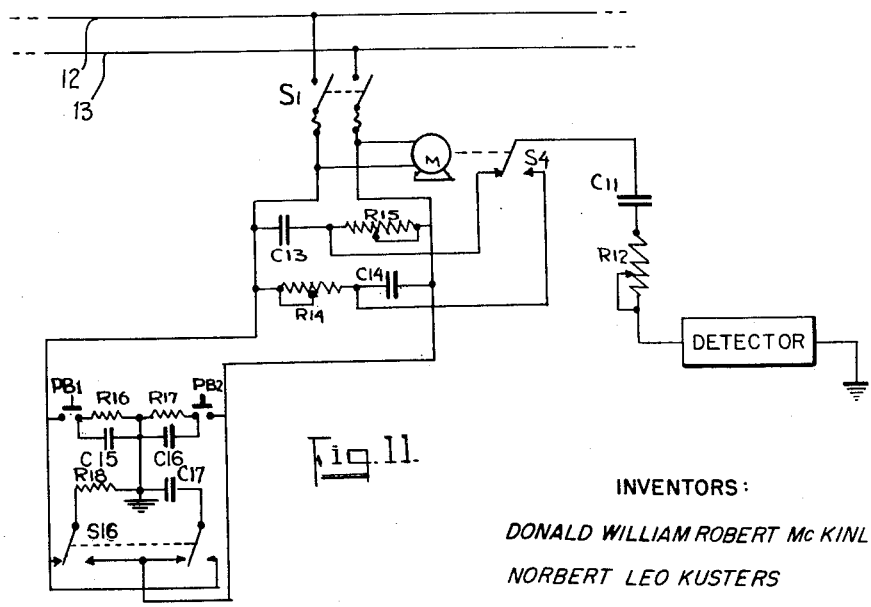
INVENTORS:
DONALD WILLIAM ROBERT McKINLEY
NORBERT LEO KUSTERS
ALLAN ROSS MORSE
by Roman J. Filipkowski
THEIR AGENT United States Patent Office 3,066,284
Patented Nov. 27, 1962

3,066,284
DYNAMIC GROUND DETECTORS
Donald W. R. McKinley and Norbert L. Kusters, Ottawa, Ontario, and Allan R. Morse, Aylmer, Quebec, Canada, assignors to National Research Council, Ottawa, Ontario, Canada, a body corporate of Canada
Filed Oct. 14, 1957, Ser. No. 689,993
7 Claims. (Cl. 340—255)

This invention relates to improvements in monitoring apparatus for connection between an electrical power distribution system and an extensive conductor, to give an indication whenever one or more circuits having less than a predetermined impedance become additionally connected between the system and the extensive conductor.

The invention particularly concerns sensitive apparatus for indicating the existence of faults to ground occurring on an isolated A.C. power distribution network, and is especially concerned with the provision of monitor equipment which alternately periodically connects a detector impedance between each conductor and ground or between tapping points of imepedance networks connected between conductors and ground, and produces audible and visible warning indications whenever an unsafe grounding condition occurs on the supply.

The National Fire Protection Association recommends the use of an ungrounded alternating current electrical distribution system in hospital operating rooms where anaesthetic is administered (NFPA No. 56, 1956). This body has recommended also that a "Ground Contact Indicator" be so arranged that a green signal lamp is displayed conspicuously so as to be visible to persons in the anaesthetizing locations and that such lamp remain lit while the system remains isolated safely from ground; if a grounding impedance of less than a predetermined value should become connected between any conductor and ground, as for example by a connection having a resistance of from zero to 10,000 ohms, a red signal lamp and an audible warning signal is required to be energized. The maximum current that may flow in a low resistance fault by virtue of the presence of the detector is specified not to exceed two milliamperes.

A typical example of a prior art ground detector for use on a two wire single phase A.C. distribution system, as described in NFPA Standard No. 56, 1956 (Appendix A-5-5) comprises a center tapped resistor connected across the line, and a larger resistor in series with a sensitive A.C. relay connected between the center tap and ground. As will be made apparent hereinafter such detector has a number of undesirable characteristics and fails to warn adequately of certain hazardous conditions, particularly balanced ground faults. In view of the fact that at 60 cycles A.C., fault currents passing through the human body of the order of two milliamperes and above are extremely irritating and since currents of the order of 10 milliamperes and higher may produce shock and possibility of death, such prior art static type of detectors must be regarded as unsafe.

Heretofore ground-contact indicators proposed for use with hospital operating room A.C. distribution systems have relied generally on determining a single fault condition, such as an insulation failure with a finite low resistance presented between one side of the line and ground. Balanced faults, i.e. simultaneously occurring connections of resistances between ground and each conductor, or a pair of capacitors similarly connected, are not detected by prior art devices. Where an installation of an A.C. supply may have tested out as having insulation resistances of the order of many megohms to ground, as may be computed by measuring leakage current on charging the conductors to a high D.C. potential, such system may actually be unsafe because of large capacity impedances, whether balanced or unbalanced, connected to ground. Noise-suppression capacitors associated with the various appliances and portable apparatus which may be used on a hospital operating room supply may contribute a net total capacitive impedance "fault" of considerable magnitude.

It is a distinct probability in modern distribution systems that two insulation failures may develop at the same time, as for example, any portable apparatus could develop an incipient fault when last used and when used again could conceivably be added to a fault in another apparatus to produce a dangerous condition.

In an ideal ungrounded electrical distribution system there is infinite impedance to ground. If a direct low resistance connection is made between any point of the system and ground no current will flow in the connector. A practical installation can only approach the ideal since insulation resistances are finite and even a very well insulated system exhibits finite capacitive impedances to ground. If a low resistance connection is applied to a point of a practical system and earthed, a ground current will be observed to flow in the connection, the value depending on a number of parameters including the location of the artificial "fault." The magnitude of the maximum ground current which can be produced by deliberately choosing the worst location for a fault is a measure of the hazard of the system. Hereinafter, this current will be called the "Hazard Index," and will be quantitatively expressed in milliamperes. The hazard index of an ideal ungrounded system is obviously zero. Any practical ungrounded installation can be considered to consist of an ideal ungrounded system with one or more finite impedance faults to ground of various types. In this way it is possible to define the hazard index of several typical fault configurations.

Any practical ground detector will obviously introduce a finite impedance between the system and ground. The hazard index of an ideal ungrounded system with a ground detector associated will no longer be zero, and the actual index will be called the "Detector Hazard Index" throughout this specification.

The "Total Hazard Index" of a practical ungrounded supply with ground detector connected is defined herein as being the sum of the A.C. currents due to fault impedances and detector impedance, the addition being carried out vectorially. In the worst case the currents will be in phase and can be added algebraically. It has been appreciated that a ground detector device should cause only a very small current to flow if any conductor of the supply becomes connected to ground.

As a practical example of the hazards that may be associated with apparatus used in an operating room, a patient being operated on with an electrically powered surgical appliance (for example, a bone saw) may at any time, due to failure of insulation of a supply conductor in the appliance, have some body part presented as a low impedance connection between the supply and ground. The current that would flow by virtue of such body circuit being established would be the vector sum of the current due to impedance presented by the ground detector between the system and ground, added to the current due to another fault or faults that may have occurred on the system. Such additional faults may have impedances of any value between zero and infinity. Provided that the additional fault on the system has a high impedance, no real danger is present; however if the fault is such that current of more than a few milliamperes may flow in the body circuit, this would be an extremely dangerous situation with risk of shock or even electrocution of the patient. To be truly satisfactory a ground detector should give warning with minimum tolerable delay of the presence of a first fault on the system.

Accordingly, applicants believe that more stringent requirements than have heretofore been proposed should be set for apparatus intended to monitor hospital operating room supplies if the utmost safety is to be insured. A ground detector device should continuously monitor the actual hazard due to any fault or faults on the supply, and the indication of the hazard should be in accordance with the possibility that current to ground as a result of the fault would exceed a specified limit.

Applicants have therefore provided, according to the invention, a dynamic ground detector which is equally sensitive to balanced or unbalanced grounding faults of any configuration of resistive or capacitive impedances likely to occur on an isolated A.C. supply wherein a detector of predetermined impedance is connected for predetermined intervals periodically between each conductor of the supply and ground alternately with its connection between another conductor and ground, and visual or auditory alarm apparatus responsive to a predetermined current in the detector path gives warning when an unsafe grounding condition exists.

In carrying the invention into effect, the detector path is arranged to have a predetermined impedance including an integrating circuit and the switching is performed by any suitable means to connect the detector either directly to each conductor or to the tapping point of each of two identical complex impedance networks connected between the conductors.

A preferred embodiment of the invention particularly applicable to an isolated two conductor power distribution system comprises a sampling unit including an impedance bridge wherein a periodic low frequency square wave switching voltage is applied from a center-tapped transformer secondary across two arms, in which isolating semi-conductor diodes are poled for unidirectional current flow in opposite senses in respective arms, and connection is made between each conductor of the supply and a tapping point of a potentiometer included in each arm, whereby presence of a fault to ground on either or both supply conductors is effective to produce output voltage appearing between the center tap and ground; detector means are provided to derive from the output voltage a current which is proportional to the largest actual current that would flow due to the fault in a very low impedance conductor if it were applied between the system and ground, and alarm means are responsive to the current so derived when it exceeds a predetermined current.

In realizing the preferred embodiment of the invention test impedances are selected having magnitudes and phase angles chosen to be equivalent to threshold faulting impedances that may become connected between one or both of the A.C. supply conductors and ground, due to which the total hazard index as measured in milliamperes that would flow in a hypothetical short between a conductor and ground in view of the test impedances would not be greater than the defined tolerable maximum; a switching wave is generated by suitable means, herein chosen to be a transistorized oscillator delivering substantially uniform period square wave voltage at the secondary of an output transformer, to open diode gates whereby to effectively connect the test impedances alternately with one conudctor or the other; the currents thus selected in turn from either conductor are passed through a detector transformer to ground and returned to one or both conductors through the test impedances (and also through any grounding fault that may happen to exist). The secondary of the detector transformer feeds a rectifier filter network, to provide a D.C. output voltage having a threshold delay and an integrating time chosen to provide uniform response for balanced or unbalanced faults whether resistive or capacitive.

In a second embodiment the invention may be realized by providing a pair of complex impedance shunt circuits across a supply, the circuits each consisting of a capacitor and a resistor and being oppositely connected in each circuit, and motor driven switching means to connect a detector impedance comprising a resistor in series with a capacitor between the junction of each shunt circuit capacitor and resistor, and ground, alternately and periodically at a rate low compared with the supply frequency, there being included a rectifier-filter means in the detector circuit to ground, whereby current due to a fault on the supply actuates a D.C. relay associated with the circuit to operate an alarm when the fault current exceeds a predetermined magnitude.

The invention may be the better understood by particular reference to the following description which is to be read in conjunction with the accompanying figures of drawing, wherein.

Figure 9:
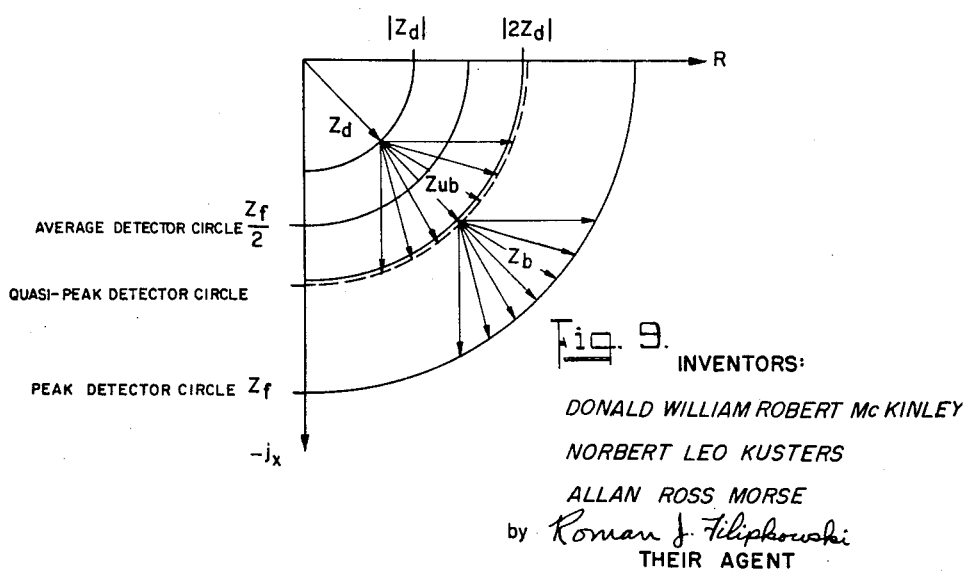
Figure 4:
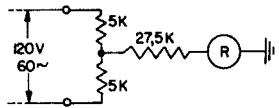
FIG. 4 is a circuit illustrating a prior art static type detector analyzed in Table I.
Figure 6:
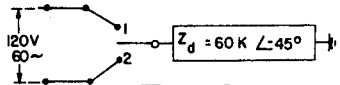

FIGS. 5a, 5b, . . . 5h are circuits showing various dispositions of faulting impedances with which the performance of the prior art detector of FIG. 4 is analyzed;

FIG. 6 is a simplified schematic circuit of a dynamic ground detector according to the invention, noted in Table II;

FIGS. 7a, 7b, . . . 7h are circuits showing various dispositions of faulting impedances with which the performance of the dynamic ground detector of FIG. 6 is analyzed;

FIGS. 8a, 8b, . . . 8h are schematic circuits showing various dispositions of faulting impedances for which detection levels of a dynamic ground detector are calculated in Table III;

FIG. 9 is a vector diagram describing detector-filter and relay response characteristics;

FIG. 10 is a circuit diagram of a dynamic ground detector having a mechanical motor-driven switching element; and, FIG. 11 is a circuit diagram showing the modification of part of FIG. 10 to provide complex impedance shunt circuits across the supply affording tapping points between which the detector sampling element is switched.

Figure 1:
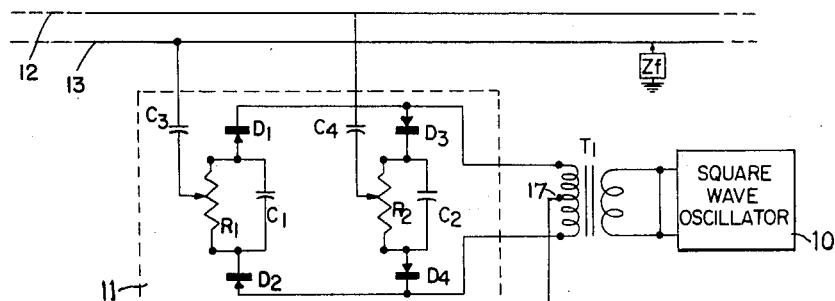
FIG. 1 is a block diagram showing the functional arrangements of a preferred form of dynamic ground detector monitor.

Referring to FIG. 1 the functions of the ground detector according to the invention will now be described in association with an isolated two-wire supply having conductors 12, 13. Oscillator 10 supplies a square wave voltage to the diode sampling gates generally indicated by dotted outline block 11, generating a frequency in the range 12 to 20 alternations per second, the wave having a peak amplitude in the range of 200 volts for a supply nominally 120 v. A.C. R.M.S. A pair of relatively large equal capacitors C1 and C2, of the order of 2 microfarads, are charged on the conducting half cycle by diode currents to a potential of 200 volts; this potential falls only slightly during the non-conducting half cycle. When a diode gate is open one side of the A.C. line, for example conductor 12, is effectively connected to the detector through potentiometer R2 and secondary of transformer T1. Small capacitors C3 and C4, connected between the gates and lines 12, 13, serve to provide, together with the remainder of the detector circuit, a total impedance such that the current flowing in the conducting half-cycle makes an angle of substantially 45 degrees with the applied line voltage. Suitable values are of the order of 0.02 microfarad. The phase angle relationship is chosen to achieve equal sensitivities to resistive, capacitive or combination fault impedances of any like configuration. Inductive faults at 60 cycles have been found to be relatively not serious and have therefore been excluded.

The same 45° relationship of current leading the applied voltage may be achieved by a parallel connection of the capacitors from the center-tap to the ends of the potentiometers R1 and R2, but the series connection, as shown, is preferable as the series resistance effectively isolates the switching waveform transients from the external circuits.

The total impedance to ground during the conducting cycle is about 200,000 ohms in the preferred embodiment, where the values of R1 and R2 are each of the order of 500 kilohms. Hence even in the event of a very low resistance path developing through human tissue as a result of some fault in an appliance, the detector current therein is limited to a maximum of 0.6 milliampere. The instrument is designed to detect and give warning of a ground fault of 56,000 ohms occurring on the line, and under these conditions the detector current is 0.5 milliampere. Such current actually flows only during a half-cycle of the oscillator, for example 1/30 second, and in the next half-cycle falls to zero. It will be obvious therefore that the average A.C. current through the primary of the detector transformer at the threshold fault level on one line conductor only, will be of the order of 0.25 milliampere. As will be later described in particular, alarms 14 and 23 are arranged to be operated by currents of such value or by any higher current flowing from the center tap 17 of transformer T1 to detector 22.

On the non-conducting half-cycle the oscillator applies a reverse bias of 400 volts to the reversely poled diodes of the diode system D1, D2, D3, D4 which is ample to hold off the peak reverse line voltage of 380 volts corresponding to a maximum expected R.M.S. A.C. line potential of 135 volts. The impedance of the diode pair which are in opposing connection at any time is several hundreds of megohms.

Figure 2:
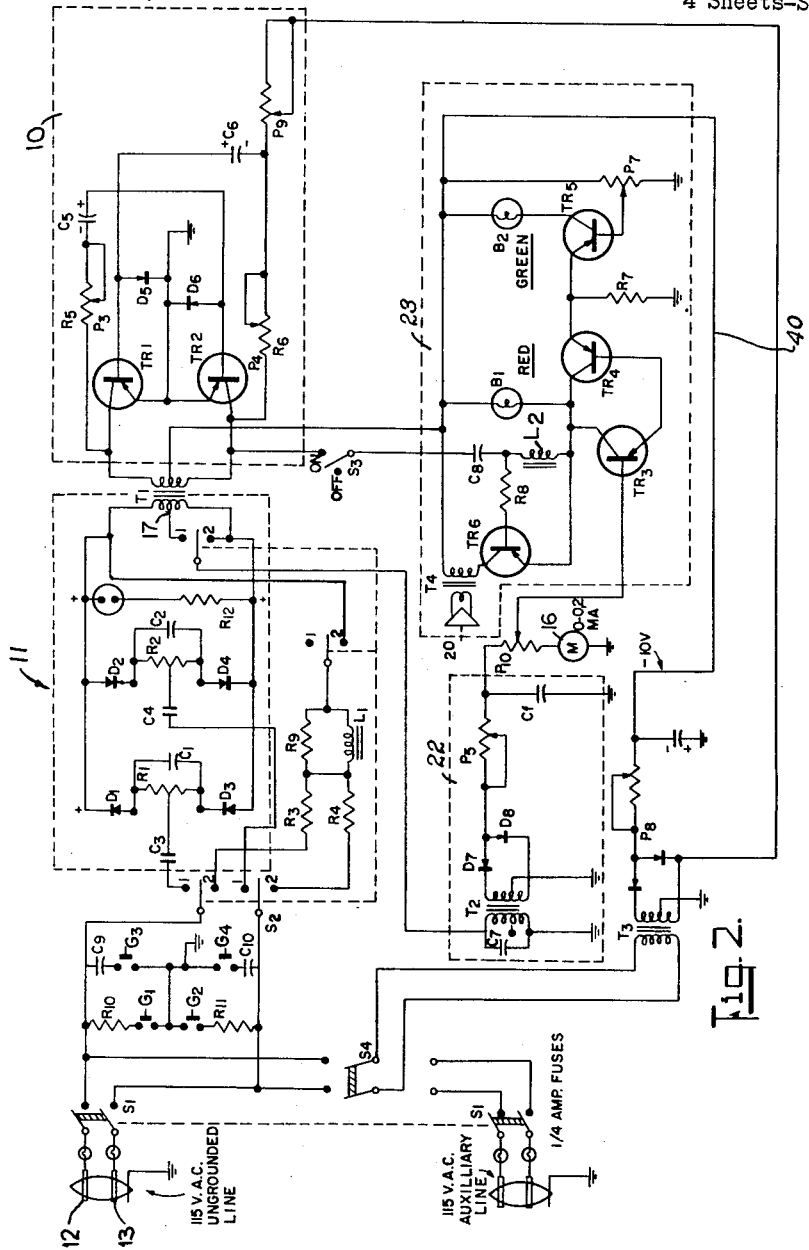
FIG. 2 is a schematic circuit diagram of a complete monitor including the circuit when modified to function as an ohmmeter.

In the event that neither side of the line has a grounding impedance connected, no voltage appears at the input to detector 22; if a fault impedance $Z_f$ should become connected to ground as shown, a 60 cycle sinusoidal waveform current will flow from the center tap 17 of T1 via C3 and D1 to ground in detector 22 during one half of the switching wave cycle, passing through the primary winding of a transformer T2 whose center-grounded secondary supplies a detector-filter unit including a full wave rectifier and an R.C. filter which has an adjustable integration time constant, shown in FIG. 2.

If both sides of the line 12, 13 are grounded through impedances, currents will flow during each half of the switching cycle.

An impedance of 56,000 ohms, either resistive or capacitive, has been adopted as the critical value of grounding impedance which should just trigger the alarm. This may be made up of any combination of impedances between either or both sides of the line and ground. The filter is made adjustable and is regulated until the same average D.C. current flows in the filter load resistance for both the balanced and the unbalanced fault cases, using either pure resistances or pure capacitances as test grounds. The alarm indicator is essentially a voltage discriminator and is adjusted to operate whenever the critical level of detected voltage is exceeded.

Figure 3:
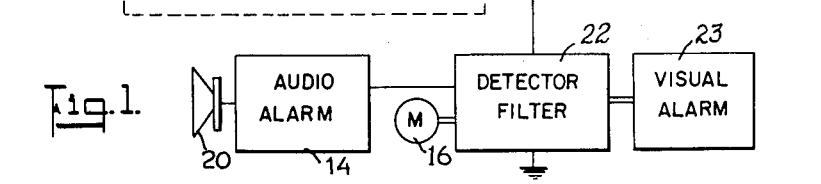
FIG. 3 is a block diagram showing the functional modification of the monitor of FIG. 1 connected as an ohmmeter.

In the event that a fault $Z_f$ develops on the line and is of sufficiently low impedance to actuate the alarms 14 and 23, the personnel responsible for safety will decide whether to cut off the power to the primary of the isolating distribution transformer before attempting to locate the fault. With no voltage on the A.C. line the ground detector will show no output. To measure the impedance of the dead line to ground the apparatus may be quickly converted to a high-voltage A.C. ohmmeter, as illustrated in FIG. 3. Loudspeaker 20 delivers an audio tone from audio alarm 14 which may be used as a convenient remote indicator in a qualitative sense since the sound ceases when the fault is removed. No harm is done if the line voltage is applied while the instrument is used as an ohmmeter.

The complete circuit diagram of the monitor/ohmmeter is shown in FIG. 2. Two separate A.C. inputs of 115 volts each are provided, one for the ungrounded lines 12, 13 under test and the other for an auxiliary 115 volt A.C. line. The latter line may be either ungrounded or grounded, or a suitable battery operated supply (not shown) may be substituted therefor, this line being provided solely as a means of supply power when the instrument is used as an A.C. ohmmeter to check the ungrounded line after a fault as developed and the test line has been de-energized. A four-pole two-position switch S2 provides, in position 1, for normal ground detector operation, and in position 2 converts the apparatus to ohmmeter function.

A square wave oscillator, generally designated 10, comprises a pair of transistors TR1 and TR2 having their emitters grounded and their collectors connected to the terminals of the primary of T1, whose center tap is connected to the negative of the power supply. The bases and collectors of TR1 and TR2 are cross-connected by RC shunt impedances having respective diode shunts to positive supply (grounded), namely D5, D6. The shunt path including the base of TR1 has a small 60 cycle voltage injected by capacitor C6 fed from transformer T3 for synchronization to a sub-multiple frequency. The oscillator may be operated at various frequencies either higher or lower than 60 cycles, but it is preferable not to operate precisely at 60 cycles since small phase variations result in large and severe changes in the relative detector sensitivities. If the switching frequency is chosen much higher than 60 cycles the sensitivity of the instrument to capacitive grounds increases proportionately without change in the sensitivity to purely resistive grounds. Therefore a sub-multiple of the line frequency has been adopted. Purely physiological reasons recommend that the oscillator be run at an integral sub-harmonic of 60 cycles; accordingly potentiometer P9 connected between R6 and C6 provides a lock so that operation may be had, for example, at switching rates of 12, 15 or 20 cycles per second as found most suitable. The interrupted nature of the detector current, as described earlier, has been found to cause about the same tingle, when an 0.3 milliampere average current is passed through the fingers or other body parts, as does a steady 60 cycle current of 1 milliampere. The instrument has therefore been designed to work at a much lower detection level than the two milliamperes maximum specified by codes in current effect. Oscillator frequencies which are not exact integral sub-multiples of line frequency yield very low frequency "beats" whose peak amplitudes are irritating to persons becoming exposed to fault current, even though the average current lies well below the sensitivity level for humans. It has been found that these and other objectionable conditions are avoided and other advantages gained by simply locking the oscillator to the sub-harmonic of line frequency. Alternatively, as will be elaborated hereinafter, a sampling rate of only a few cycles per second or even less than one per second may also be employed, in which case the beat effects are considerably less pronounced.

The diode gate bridge system generally designated 11 has no moving parts in the sampling circuit, and the detector-filter block 22 similarly avoids mechanical switches. It will be observed that current flowing in the detector circuit from the center tap 17 of the secondary of T1 passes through the primary of detector transformer T2 shunted by capacitor C7, to instrument ground, which is connected suitably to building ground. A tapping point in the secondary of T2 is earthed and a rectified output voltage proportional to the current in the primary appears at the junction of rectifying diodes D7, D8, connected in series opposing across the secondary terminals; this output voltage is passed through potentiometer P5 and is shunted to earth by capacitor Cf, which provides an integrating time constant filter for the rectified current. The output voltage is also applied to the series connection of potentiometer P10 and indicating milliameter M, preferably having a range of 0 to 0.2 ma.; a tap on P10 leads a fraction of the detector voltage to the alarm system generally indicated by dotted block outline as 23, being applied to the base of transistor TR3. The emitter of TR3 is biased positively from the local D.C. supply, by a circuit which includes the emitter-to-base path provided by rectification of the output of the secondary of T3, to supply negative bus 40 of another transistor TR4, and resistor R7 connected to positive ground. Emitter current in transistor TR5 is also taken from positive supply through R7. When the D.C. potential on the tapping point of P10 is sufficiently high with respect to instrument ground, the bulb B1 is illuminated by current passed through TR4 and R7. When the potential on the tapping point of P10 is less than the threshold value, TR4 is biased off and the emitter potential of TR5 rises above the potential of its base, the latter being established by the position of tapping point of potentiometer P7 as a positive value. TR5 therefore becomes biased on so that the lamp B2 in its collector circuit is energized to show the "Green" or safe monitor indication. When the potential of the detected output voltage of the tap of P10 is sufficient to cause B1 to light, transistor TR6 whose emitter is serially connected with collector of TR4 and whose base is connected by resistor R8 to the junction of inductance L2 and capacitor C8 forming a tuned circuit, produces an oscillation at a frequency of the order of 1000 cycles per second. An audio tone sound output is delivered by way of transformer T4 whose primary is in the collector circuit of TR6 and whose secondary feeds the loud-speaker 20.

A modulation of the audio tone at the frequency of the switching oscillator is produced by returning capacitor C8 of the audio oscillator tuning circuit to one side of the primary of T1, through switch S3 which also serves as on-off switch for the audio alarm. It has been found that such modulated tone has a more insistent auditory alarm characteristic than the unmodulated tone and is preferred for that reason.

Provision is made in the instrument to apply test faults to ground between either conductor and ground, by pressing any one or any combination of a set of four push buttons, G1, G2, G3 and G4. For example, a resistive test fault may be applied by pressing the button G1 to connect R10 between line 12 and ground, and a capacitive fault may be applied to this line by connecting capacitor C9 through a push button switch G3 to ground. Similar provision is made for buttons G2 and G4 to connect R11 and C10 as test faults between conductor 13 and ground. These test faults are useful in obtaining a direct check on the performance of the monitor, and may be used to calibrate and adjust the threshold level at which warning is desired, by choosing the tap point of P10, and by regulating the detector-filter characteristics, by adjustment of P5. The instrument may be made to give indications based on peak amplitudes of currents, or on average current level, or may be set to indicate an intermediate current level, as will be more fully described hereinafter. The test faults may be combined as balanced or as unbalanced faults of any configuration of reactances. Preferably the values of R10 and R11 are identical, as are the values of C9 and C10.

The modification of the device as an ohmmeter by throwing S2 into position 2 interposes resistors R3 and R4 between each line and a paralleled combination of R9 and inductance L1, as part of a series path to the primary of detector transformer T2. By this conversion, and with oscillator 10 powered by an auxiliary supply via S4 or battery equivalent, the secondary of T1 applies a square wave 15 cycle voltage in series with the detector and the line. L1 may be any large inductance and R9 has been chosen as 270,000 ohms, but neither value is at all critical. This choice provides equalization of response for a resistive or a capacitive fault of 56,000 ohms impedance at 60 cycles, but other values may be chosen for equalization at other nominal threshold fault impedances. The meter 16 is suitably calibrated to indicate total impedance.

The detector-filter circuit referred to above may be modified by shorting out resistance P5 so that the storage condenser Cf, which may be a 10 microfarad size, tends to charge rapidly and to hold charge during the succeeding half cycle. In this condition the detector output voltage will be higher with unbalanced ground faults than with balanced faults; when the resistance of P5 is a maximum, the filter becomes more nearly an averaging device, and the unbalanced ground condition will provide a lower D.C. level than the balanced grounds. By trial, a setting of P5 can be found, which is not critical, at which the D.C. output levels are the same for both conditions, so that whether one conductor or both are resistively faulted to ground by equal R, or whether one or both are capacitively faulted to ground by equal C, the detection sensitivity will be the same. Output level is higher for the combination of a capacitive fault on one conductor and resistive fault on the other. Control has been found simple and direct in discriminating between faults of the order of 55,000 to 60,000 ohms, whose detection is to be indicated, while faults of 70,000 ohms are to be ignored.

Figure 5:
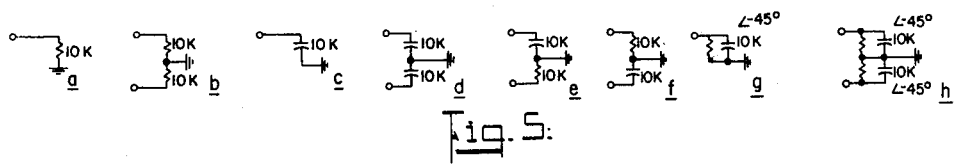

A comparison of the detection performance of the improved monitor as compared with prior art static type detectors may be appraised with reference to Tables I and II. The types of ground faults, both balanced and unbalanced configurations of specified impedances, with which the prior art device of FIG. 4 is analyzed appear in FIG. 5. The relay closing current is set at 1.5 ma. and the detector hazard index as defined hereinbefore is 2 ma. It will be apparent that certain unbalanced faults of FIGS. 5a and 5g are relatively large hazards and that all balanced faults are undetected. It should be noted that the impedances have been selected to provide a constant fault hazard index of 12 ma., and are of the order of 10 kilohms.

TABLE I

| Ground detector as in FIG. 4.—closing current 1.5 ma. | Ground faults as in FIG. 5 | | | | | | | |
|---|---|---|---|---|---|---|---|---|
| | (a) | (b) | (c) | (d) | (e) | (f) | (g) | (h) |
| Fault hazard index, ma | 12 | 12 | 12 | 12 | 12 | 12 | 12 | 12 |
| Relay current in ma | 1.5 | 0 | 1.9 | 0 | 1.7 | 1.7 | 1.59 | 0 |
| Detector hazard index, ma | 2 | 2 | 2 | 2 | 2 | 2 | 2 | 2 |
| Total hazard index, ma | 14 | 14 | 12.2 | 12.2 | 14 | 14 | 13.5 | 13.5 |
| Maximum undetected total hazard index, ma | 14 | Inf. | 5 | Inf. | 9 | 9 | 11.5 | Inf. |

TABLE II

Figure 7:
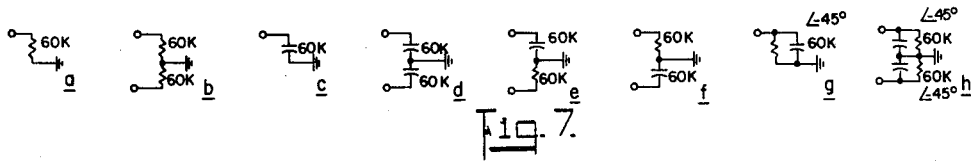

| Ground detector as in FIG. 6. | Ground faults as in FIG. 7 | | | | | | | |
|---|---|---|---|---|---|---|---|---|
| | (a) | (b) | (c) | (d) | (e) | (f) | (g) | (h) |
| Fault hazard index, ma | 2 | 2 | 2 | 2 | 2 | 2 | 2 | 2 |
| Detector hazard index, ma | 2 | 2 | 2 | 2 | 2 | 2 | 2 | 2 |
| Total hazard index, ma | 3.8 | 3.8 | 3.8 | 3.8 | 3.8 | 3.8 | 4.0 | 4.0 |
| Detector currents, ma $\{I_{d1}$ | 0 | 0.72 | 0 | 0.72 | 0.83 | 0.83 | 0. | 0.67 |
| $\quad\{I_{d2}$ | 1.04 | 0.72 | 1.04 | 0.72 | 0.83 | 0.83 | 1.0 | 0.67 |
| Peak detector current, ma | 1.04 | 0.72 | 1.04 | 0.72 | 0.83 | 0.83 | 1.0 | 0.67 |
| Average current in detector, ma | 0.52 | 0.72 | 0.52 | 0.72 | 0.83 | 0.83 | 0.5 | 0.67 |
| (Peak-average) difference, ma | 0.52 | 0 | 0.52 | 0 | 0 | 0 | 0 | 0 |
| Quasi peak detector current, ma (=diff./0.28, plus average) | 0.72 | 0.72 | 0.72 | 0.72 | 0.83 | 0.83 | 0.69 | 0.67 |

TABLE III

Figure 8:
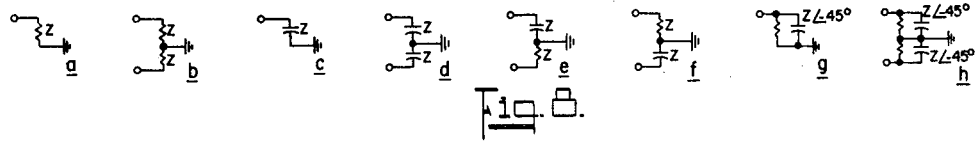

| Detection levels of dynamic ground detector circuit as in FIG. 6 | | Ground faults as in FIG. 8 | | | | | | | |
|---|---|---|---|---|---|---|---|---|---|
| | | (a) | (b) | (c) | (d) | (e) | (f) | (g) | (h) |
| Peak sensitive | Fault impedance detection level in kilohms | 133 | 74 | 133 | 74 | 95 | 95 | 120 | 60 |
| | Maximum undetected total hazard index in ma | 2.7 | 3.6 | 2.7 | 3.6 | 3 | 3 | 3 | 4 |
| Average sensitive | Fault impedance detection level in kilohms | 36.5 | 74 | 36.5 | 74 | 95 | 95 | 30 | 60 |
| | Maximum undetected total hazard index in ma | 5 | 3.6 | 5 | 3.6 | 3 | 3 | 6 | 4 |
| Quasi-peak l₁ sensitive | Fault impedance detection level in kilohms | 70 | 74 | 70 | 74 | 95 | 95 | 60 | 60 |
| | Maximum undetected total hazard index in ma | 3.4 | 3.3 | 3.4 | 3.3 | 3 | 3 | 4 | 4 |
| Quasi-peak l₂ sensitive | Fault impedance detection level in kilohms | 74 | 74 | 74 | 74 | 95 | 95 | 65 | 60 |
| | Maximum undetected total hazard index in ma | 3.3 | 3.3 | 3.3 | 3.3 | 3 | 3 | 3.8 | 4 |

In contrast therewith, the performance of the dynamic type of detector according to the invention as schematically drawn in FIG. 6 is analyzed in Table II for a similar group of ground faults chosen for constant fault hazard index of 2 ma., with a detector hazard index of 2 ma. also. The detector currents when sampling line 1 and line 2 are tabulated as $I_{d1}$ and $I_{d2}$. The total hazard index may be shown to uniformly lie below 4 ma.

A further analysis of the capabilities of the dynamic type of ground detector for various dispositions of fault impedances with a more sensitive detector set to indicate fault at 0.67 ma. is presented in Table III. For various adjustments of detector response to the sampling currents, increasing sensitivity is obtained with unbalanced faults for detector settings to indicate on average current levels, on quasi-peak current levels and on peak current levels; constant sensitivity is obtained with balanced faults.

In FIGS. 10 and 11 two further embodiments of electromechanically actuated switching element forms of ground detectors are described. In FIG. 10 motor M is chosen as a type having shaft rotational speed of the order of 30 r.p.m., driving a cam not shown engaging the single-pole, double-throw element of switch S4. Any suitable mechanical drive means may be employed capable of switching at a predetermined rate, the apparatus preferably comprising adjusting means for equalizing the intervals during which each line remains connected and for establishing that the transfer time between alternate positions is short. In the faulted condition of either conductor 12 or 13, or if both conductors are connected by fault impedances to ground, a current flows through the series connection of capacitor C11 and variable resistor R12, to the rectifier ring 18 and thence to ground. The detector impedance comprises the impedances of the foregoing elements and the winding of relay Y1. If one successful apparatus where C11 was 0.063 microfarad, having an impedance of 42 kilohms at 60 cycles, the resistive elements of the detector were chosen equal to this impedance, thereby providing that the detector current leads the voltage by 45 degrees. Detection sensitivity is primarily adjusted by regulating the tension of the contact spring of Y1, using a test fault having an impedance of 60 kilohms, so that S5 just closes and the red bulb B1 lights and the buzzer BZ rings, presuming switch S6 is in the ON position. A test fault may be applied by S7 to connect R13 between either conductor and ground.

Such test fault is useful in adjusting the switching contacts of S4 to produce equal period contacts, as observable by noting the meter readings in the relay winding path.

With C12 chosen to be 80 microfarads and a total detector impedance of 60 kilohms with 45 degree current leading, and relay Y1 operating current set for 0.56 ma., values of minimum detectable faults as shown in FIG. 8 were not below 60 kilohms for any element, and for any combination of elements.

The value of C12 and the switching rate are jointly varied so as to obtain the same variations in detector currents when indicated as average current levels, as quasi-peak current levels, and as peak current levels, as were obtained with the embodiment of FIG. 2. Alternatively an adjustment of relative sensitivities may be effected by employing a dashpot (not shown) on the relay armature.

In the modification of FIG. 11 a resistance-capacitance shunt circuit comprising C13 and R15 in series shunted across the line conductors 12, 13 has its junction point between C13 and R15 connected to the contact point of switch S4, and a similar resistance-capacitance circuit comprising C14 and R14 has its junction point connected to the other contact of S4. The values of resistance and capacitance used may be made fairly low, provided that elements of the same kind have equal reactance at 60 cycles. The impedances of each shunt circuit are so chosen that the voltage at the junction point is substantially 0.707 times the line-to-line voltage and the corresponding voltage between junction points is equal to the line voltage, in phase quadrature with the line-to-line voltage, while junction point voltage leads the line voltage by 45 degrees. The shunt circuit impedances are moreover chosen in conjunction with the impedance of the detector circuit including elements C11 and R12 together with relay winding Y1 so that the effective impedance of the detector circuit bears a predetermined relationship to the maximum fault impedance to be detected. Specifically the impedance of the detector circuit may be chosen to be 0.707 times the maximum fault $Z_f$ impedance of 120 kilohms, in an apparatus using the same relay as was found suitable for the detector of FIG. 10 which was sensitive to faults of 60 kilohms and lower. The detector 22 of FIG. 11 is to be understood to comprise the same ring rectifier 18, capacitor C12, and a direct current meter as shown in FIG. 10.

The circuit of FIG. 11 as specifically described provides a detector hazard index equal to the maximum undetected fault hazard index and equal to one-half the value of the Total Hazard Index. It also achieves equal detection thresholds for balanced and unbalanced faults, and in conjunction with suitably chosen integrating elements is capable of indicating reliably the hazard due to a purely resistive fault occurring on one conductor of the line simultaneously with the presence of the other conductor of the line of a purely capacitive fault.

If it is preferred to decrease the detector hazard index for any reason, it will be readily apparent that the detector circuit impedance may be increased, e.g. by a factor of two, whereby the detector hazard index becomes one-half the fault hazard index.

Adjustments of switches S4 and relay closing current are advantageously made by providing a number of test faults to ground, selectable by three position movable switch arm S16 to either left or right, or by pressing push buttons PB1, PB2. By operating S16 to one position, resistor R18 may be connected with line 12 and capacitor C17 with line 13, while for another operated position the line connections are reversed. By operating the push buttons PB1 or PB2, fault impedance combinations C15, R16, and C16, R17 may respectively be applied between conductors 12 and 13 to ground.

The adjustment of the current-averaging function of the detector circuit is obtained, as has been indicated earlier, by jointly regulating the value of capacitor C12 and by control of the switching rate. In an actual embodiment wherein the filter capacitor C12 was 50 microfarads, the switching speed was 96 samplings per minute, and the detector relay closing current was 0.33 ma., the apparatus responded equally for balanced faults as for unbalanced faults comprising a pure resistance grounding one side of the line and a pure capacitance grounding the other side of the line. Absolute fault values at the detection threshold indicated were not below 120 kilohms and the sensitivity remained constant for all fault dispositions shown in FIGS. 8a to 8h. It will be readily apparent that the performance of this detector is superior to that of the others described. The performance remained substantially the same with a sampling rate of 60 per minute and C12 chosen as 90 microfarads.

Reference to FIG. 9 will reveal the nature of the modification of response of detectors as in FIGS. 2, 6, and 10 by adjustment of integrating circuit elements in order to make the apparatus more nearly uniformly responsive to balanced and unbalanced faults, both resistive and capacitive. It is to be noted that the "quasi-peak" detector circle in the impedance vector diagram can be arbitrarily adjusted by design to any radial position between the average and the peak detector circles. The fault impedance detection levels $Z_f$ for balanced and unbalanced faults can be read off quite readily from the impedance vector diagram.

While the foregoing disclosure has dealt mainly with apparatus for monitoring a two-wire line isolated from ground, the dynamic detector is by no means limited to such distribution system. Polyphase lines may in a similar manner have a detector device alternately and sequentially connected by a switching element for the indication of ground faults.

While the embodiments of the invention have been described with particular reference to preferred operating ranges of detector currents and minimum threshold fault impedances chosen on the basis of safety to humans, it is regarded as merely a design choice and expedient consistent with the teachings herein presented to construct apparatus for operation at other current levels and at other threshold impedance fault conditions.

We claim:

1. In combination with an alternating current supply line having its line conductors isolated from ground and subject to the probability of connection to ground by fault impedances, a two-terminal detector circuit responsive to balanced and unbalanced faults of any configuration of capacitive and resistive impedances, said circuit having one terminal grounded, a bi-directional current flow switching element connected to the other terminal of said detector circuit and operable to connect said detector circuit with individual line conductors, switching element actuating means effective to periodically and sequentially connect respective individual line conductors with said detector circuit, said circuit comprising a current rectifier, a resistor, and a capacitor connected in series wherein said rectifier responds to alternating current flowing in said circuit and the reactance of said capacitor at the frequency of said supply is substantially equal to the magnitude of the total resistive impedance of said detector circuit, whereby the phase angle of said current is substantially 45 electrical degrees in advance of said supply line voltage, and warning means responsive to rectified current exceeding a predetermined current.

2. The combination claimed in claim 1 wherein the resistor is a variable resistor and the combined impedance of said detector circuit at the frequency of the supply has a magnitude which is substantially 0.707 times the magnitude of a threshold fault impedance for which said warning means respond.

3. The combination claimed in claim 2 wherein said switching element holds said conductors connected with said detector circuit for an interval of at least one cycle of said supply frequency.

4. The combination claimed in claim 2 wherein said switching element holds said conductors connected with said detector circuit for an interval which is an integral multiple of the period of alternation of the supply frequency.

5. Fault indicating apparatus for connection with a two-wire alternating current distribution system having its line conductors electrically isolated from ground and susceptible to grounding by fault impedances of any configuration of capacitive and resistive impedances, comprising a detector circuit having equalized sensitivity to balanced and unbalanced fault configurations and comprising a first shunt network consisting of a first resistor and a first capacitor connected in series with each other between the line conductors providing a first junction point common to said first resistor and said first capacitor, a second shunt network consisting of a like second resistor and a like second capacitor connected in series with each other between the line conductors and providing a second junction point common to said second resistor and said second capacitor, each resistor having an impedance substantially equal in magnitude to the impedance of one of said capacitors at the supply frequency, said first resistor and said second capacitor each having a terminal connected to the same conductor, fault current indicating means connected with ground, switching means operable to electrically connect said current indicating means periodically and alternately with said first and said second junction points for alternating fault current flow to ground therethrough, said current indicating means comprising a capacitor, a resistor, and a full-wave rectifier connected in series, said rectifier providing a direct current output, a filter connected across said output, and a current measuring device connected as load for said output, said filter being adjustable to condition said device to indicate a parameter of said rectifier load current selectable within the range including average current and peak instantaneous current.

6. The apparatus of claim 5 wherein said detector circuit presents an impedance to fault current which is substantially 0.707 times the magnitude of a faulting impedance for which said detecting means produces a threshold output current.

7. The apparatus of claim 5 wherein said switching means operate at a switching rate such that each junction point is connected with said current indicating means for at least one cycle of said supply frequency.

References Cited in the file of this patent

UNITED STATES PATENTS

| | | |
|---|---|---|
| 1,055,018 | Burnham | Mar. 4, 1913 |
| 1,856,172 | Schimpf | May 3, 1932 |
| 2,010,840 | Baugham | Aug. 13, 1935 |
| 2,022,758 | Corderman | Dec. 3, 1935 |
| 2,141,373 | Blount et al. | Dec. 27, 1938 |
| 2,360,288 | Stevens et al. | Oct. 10, 1944 |
| 2,374,030 | Monori | Apr. 17, 1945 |
| 2,390,778 | Cook | Dec. 11, 1945 |
| 2,428,563 | Fountain | Oct. 7, 1947 |
| 2,542,838 | Reagan | Feb. 20, 1951 |
| 2,660,717 | Hood | Nov. 24, 1953 |
| 2,697,217 | Jeffers | Dec. 14, 1954 |
| 2,700,125 | King et al. | Jan. 18, 1955 |
| 2,817,074 | Faulkner | Dec. 17, 1957 |
| 2,832,916 | Kennedy | Apr. 29, 1958 |